Sept. 13, 1960 P. J. KIRCHER 2,952,760
THERMOSTAT FOR COFFEE MAKERS
Filed July 8, 1958 2 Sheets-Sheet 1

INVENTOR
PAUL J. KIRCHER
BY
*Lindsey and Prutzman*
ATTORNEYS

Sept. 13, 1960 P. J. KIRCHER 2,952,760
THERMOSTAT FOR COFFEE MAKERS
Filed July 8, 1958 2 Sheets-Sheet 2

INVENTOR
PAUL J. KIRCHER
BY
Lindsey and Pritzman
ATTORNEYS

United States Patent Office 2,952,760
Patented Sept. 13, 1960

2,952,760

THERMOSTAT FOR COFFEE MAKERS

Paul J. Kircher, Plainville, Conn., assignor to Landers, Frary & Clark, New Britain, Conn., a corporation of Connecticut Filed July 8, 1958, Ser. No. 747,177

4 Claims. (Cl. 200—139)

This invention relates to improvements in thermostatic controls generally; and more particularly, it relates to thermostatic controls of the type incorporated in appliances to govern the heating cycle thereof.

An object of the invention is to provide an improved thermal switch particularly adapted for use in a coffee percolator and adjustably controlled by a lever extending externally of the percolator, wherein calibration of the switch to obtain the desired operating temperature range may be easily accomplished without the use of tools and preferably without dismantling the percolator.

Another object is to provide an appliance type thermostat permitting calibrating of the adjustable range thereof from the exterior thereof, but which requires the performance of deliberate movement to effect such calibration, thereby preventing accidental change of calibration.

A further object is to provide such a calibrating means which is of simple and economical construction, which will operate efficiently and which will permit calibration throughout the full capacity of the thermostat.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
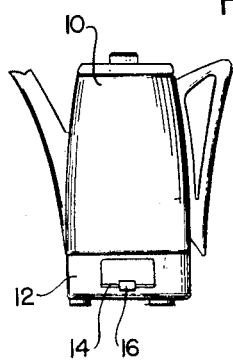
Fig. 1 shows in elevation a known type of coffee percolator incorporating the invention.

The coffee percolator shown in Fig. 1 includes the usual vessel 10 supported on a housing-like false bottom indicated as the base 12 which encloses the control mechanism, base 12 having an elongate slot 14 through which extends a control lever terminating in a fingerpiece or knob 16 and movable along the slot for adjustment of a thermal switch to govern the percolation cycle.

Figure 2:
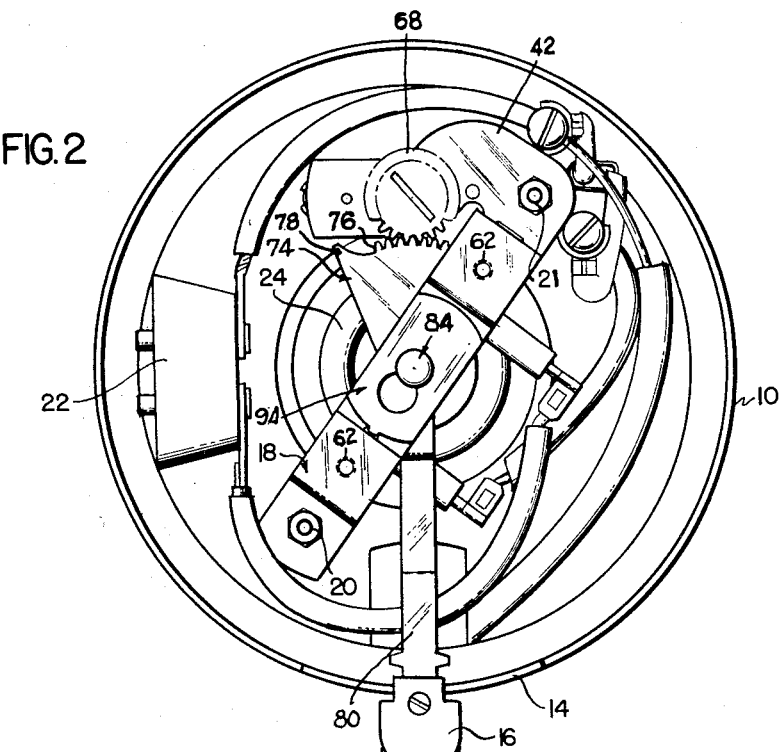
Fig. 2 is an enlarged bottom plan view of the percolator of Fig. 1 with the false bottom thereof removed and showing a thermostatic control structure attached to the vessel and incorporating the invention.

With base 12 removed, the enlarged view of Fig. 2 shows the general disposition of the thermal control switch mechanism as attached to the bottom of vessel 10. The usual connector plug 22 provides series connection of a helical heater element 24 through the thermal switch herein described in a known manner, hence the manner in which the device is wired is of no importance in teaching the present invention, other than illustrating that the invention is particularly adapted for use in the environment illustrated.

Figure 3:
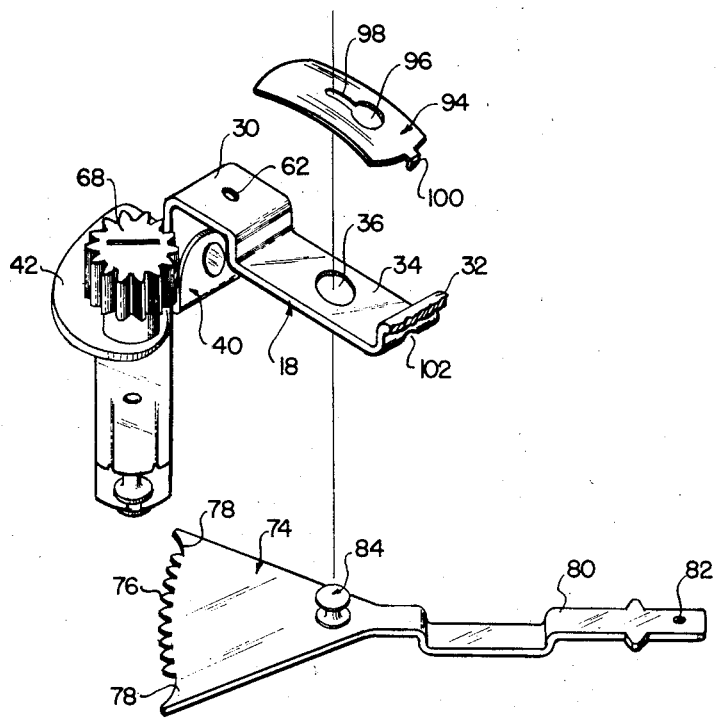
Fig. 3 is an exploded perspective view of control and calibrating elements of the structure shown in Fig. 2.
Figure 5:
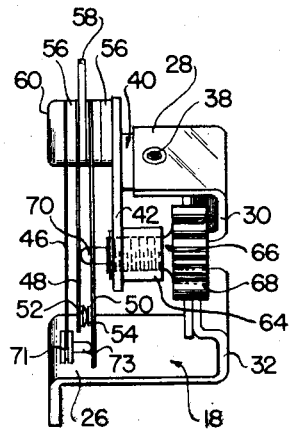
Fig. 5 shows in side elevation the structure of Fig. 4.
Figure 4:
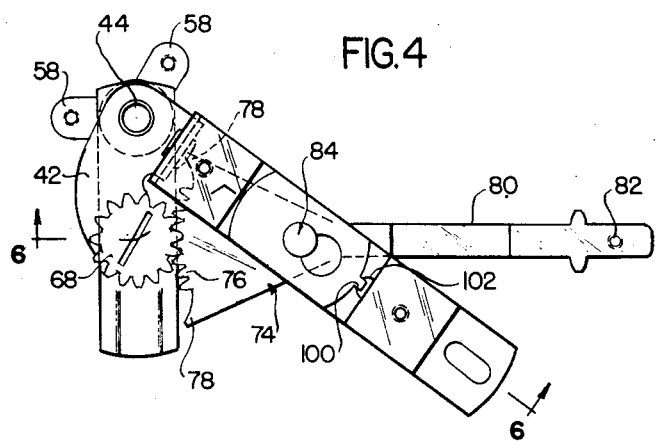
Fig. 4 is a bottom view showing the elements of Fig. 3 in assembled form.

Referring to Figs. 3, 4 and 5, the switch components are shown both in an exploded and in assembled form. Mounted on the bottom of vessel 10 by means of a nut and screw indicated at 20 is a bracket 18 having side members or legs 26, 28, at right angles to transverse portions 30, 32 extending laterally of a depressed central portion 34 provided with a circular aperture 36. Side member 28 has a terminal switch assembly secured thereto by rivet 38, including an angular mounting bracket 40 having an ear-like base portion 42 positioned normal to leg 28. A bi-metallic arm 46 and a pair of springlike contact carrying switch arms 48 and 50 provided with registerable contact points 52 and 54, respectively, are held in clamped assembly on the base portion 42 by a hollow brass rivet or eyelet having an enlarged head 60 and a peened shank 44. Insulating washers 56 serve as spacers for the arms with each arm 48 and 50 having a terminal lug 58. The fixed end of the bi-metallic arm 46 is engaged against the rivet head 60 which serves as a heat path between bi-metallic arm 46 and the metallic surface of the bottom of vessel 10 to which the bracket 40 is clamped by the screw and nut indicated at 21 with the screw extending through the hollow rivet. The transverse portions 30, 32 of bracket 18 are threaded at 62 for screw mounting of base 12 thereto.

Portion 42 of bracket 40 has a threaded collar 64 secured thereto to receive the threaded shank of a control member 66 of electrical insulating material. Member 66 has a pinion 68 formed integrally at one end thereof and a switch control pin 70 at the other end, an aperture being provided in arm 50 to allow pin 70 to freely extend therethrough for contacting engagement with arm 48. Arm 48 is inherently biased toward pin 70 so that it is positioned by the pin 70 which is moved in and out by rotation of gear 68 in opposite directions. The free end of bi-metallic arm 46 is provided with an electrically insulating button 71 having a pin 73 for engagement with the lower end of arm 50 to move the arm 50 away from arm 48 to open the contacts 52 and 54 when the vessel is heated to a temperature depending on the setting of pin 70.

The switch mechanism above described is known, and the invention which relates to the manner in which gear 68 may not only be rotated by a lever means extending externally of the percolator, but may be calibrated for operation through different ranges is described below.

Figure 6:
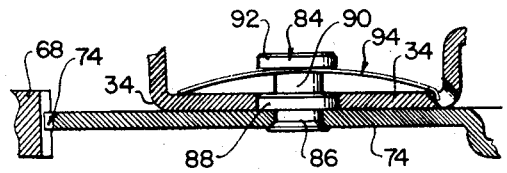
Fig. 6 is an enlarged fragmentary broken line section taken along line 6—6 of Fig. 4.
Figure 7:
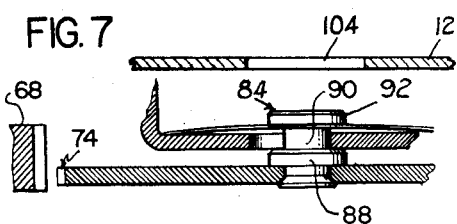
Fig. 7 is a view similar to Fig. 6 with the parts shown in position for calibration of the device and also showing a fragmentary section of the false bottom.

Fig. 4 shows gear sector 74 having teeth 76 in mesh with gear 68 and shoulders 78 serving as stops as they contact gear 68 to limit sector movement through the arc defined therebetween. The sector converges into an elongate lever portion 80, the outer end, which extends through slot 14 in false bottom 12, being threaded at 82 for attachment of the control knob 16, shown in Fig. 1. The sector has fixed thereto a pin 84 spaced from teeth 76 as shown in Figs. 6 and 7. Pin 84 has its bottom end peened at 86 to segment 74 and is provided with a cylindrical collar 88 engaging the segment and a button head 92 spaced from the collar 88 by the intermediate portion 90. The collar 88 has substantially the same diameter as aperture 36 and when engaged therein forms a fixed pivot for the sector 74 and its lever arm 80.

With the parts of Fig. 3 assembled as shown in Fig. 4 and pin 84 projected through aperture 36 of bracket 18, an arcuate leaf spring 94, having an aperture 96 larger than button 92 and a channel 98 of less width than the button is mounted in the position best shown in Figs. 4 and 6. When assembling the device, button 92 is first projected through aperture 96, spring 94 then being moved to position bearing 90 in channel 98 with spring 94 maintained under pressure therebetween. Spring 94 is provided with a lug 100, receivable in aperture 102 in bracket 34, to lock the spring in the Fig. 4 position to complete the assembly with collar 88 in aperture 36 of bracket 18.

With the various parts held in spring biased assembly as above with the collar 88 positioned in aperture 36, segmental gear teeth 76 are in mesh with the teeth of gear 68. The thermal switch is thus controllable within limits defined by the gear sector, by oscillation of lever 80 to move pin 70 axially of collar 64. In order to calibrate the control, i.e., to alter the thermal operating range of an appliance such as a percolator, the pin 84 is pushed in manually by pressure on the head 92 to free the collar 88 from the aperture 36. This places the smaller diameter portion 90 of the pin within the aperture 36 permitting the control lever arm 80 to be pulled outwardly a limited amount sufficient to free the segmental gear teeth 76 from the pinion 68. With the segment out of mesh with the pinion 68, the lever 80 may be swung in either direction to change its pivoted position without turning the pinion 68, and thus, it is possible to correct or calibrate the setting of the control to provide the desired range of temperature settings desired. After the setting of the lever 80 and segment 74 in desired position, the lever 80 is pushed in to re-engage the sector gear teeth 76 with the pinion 68 which at the same time lines up the collar 88 with the aperture 36 whereupon the spring 94 acting on the pin 84 snaps the pin 84 outwardly pulling the collar 88 into the aperture 36 and fixing the control in calibrated operating position.

As will be realized, calibration of the control may be accomplished without the use of any tools in a simple and convenient manner. Furthermore, by providing an access hole 104 in the bottom of the base 12 (see Fig. 7) to permit the pin 84 to be pushed in without removing the base 12, it is possible to calibrate the device without any disassembly of the parts. Furthermore, the operations required in order to calibrate the control are not such that they would tend to occur accidentally or otherwise during subsequent normal use of the device so that even though the calibration can be effected from the outside of the device, the desired calibration will not be disturbed during such subsequent use.

As will be apparent, variations and modifications in the embodiment shown and described herein may be made within the skill of the art, and all such variations and modifications are intended to be included within the scope of the invention.

I claim:
1. In combination with a thermostatically operated switch, a rotatable control member provided with gear teeth, a gear segment for engagement with the gear teeth of the control member having a pivot, a support for the pivot providing for limited movement of said gear segment transversely of the pivot between two stable positions, said limited movement being sufficient to engage and disengage the gear segment with the gear teeth of the control member, and means on the support for releasably retaining the pivot in a stable position to engage the gear segment with the gear teeth of the control member.

2. In combination with a thermostatically operated switch, a rotatable control member provided with gear teeth, a gear segment for engagement with the gear teeth of the control member, a pivot for the gear segment having a portion of larger dimension and a portion of smaller dimension, means forming a support for said pivot having an aperture of substantially the same dimension as said portion of larger dimension of the pivot, and means for releasably retaining the portion of larger dimension of the pivot in the aperture, said aperture being located to position the gear segment in mesh with the gear teeth of the control member when the pivot portion of larger dimension is in the aperture and permitting the gear segment to be disengaged from the gear teeth of the control member when the pivot portion of smaller dimension is in the aperture.

3. In a device of the character described, a thermal switch having a rotatable control member, the setting of the thermal switch being responsive to rotation of the rotatable member, a gear fixed to said rotatable member for the rotation thereof, means for the rotation of said gear from a remote point comprising a lever actuated gear sector in mesh therewith, a support provided with a circular aperture, a stepped pivot fixed to said sector and having a cylindrical bearing portion snugly receivable in said aperture and positioned to maintain said sector in mesh with said gear and an axially aligned smaller bearing portion loosely receivable in said aperture to permit movement of the sector out of mesh with the gear, and a spring between the pivot and the support to urge said sector against said support with said first bearing portion disposed in said aperture, said pivot being depressible against said spring to position said second bearing portion in said aperture to permit said sector to be moved out of mesh with said gear.

4. In a coffee percolator of the type in which an electrical heating element is controlled by a thermal responsive switch having a rotatable control shaft, the setting of the switch being controlled by rotation of the shaft and a housing enclosing the switch and shaft, the combination comprising a gear fixed to said shaft for the rotation thereof, a pivoted gear sector in mesh with said gear and enclosed by the housing, said sector having a lever extending through said housing for sector pivoting from a point exteriorly of the housing, and means forming the pivot for said sector comprising an apertured supporting bracket, a stepped pivot fixed to said sector to extend normal thereof and extending through the bracket aperture, said pivot having a bearing adjacent said sector, a smaller bearing adjacent thereto, and a spring retaining button at the end of the shaft, and an apertured leaf spring held biased between said cap and bracket to maintain said sector pivoted to said bracket with the first bearing in said aperture, said housing being apertured to provide manual access to said button from the housing exterior, whereby depression of said button against said leaf spring moves the smaller bearing into the aperture to permit said sector to be moved by said lever out of mesh with said gear and remeshed therewith from the exterior of said housing.

References Cited in the file of this patent
UNITED STATES PATENTS

| | | |
|---|---|---|
| 2,532,859 | Rosche | Dec. 5, 1950 |
| 2,540,337 | Kaser | Feb. 6, 1951 |
| 2,562,425 | Huck | July 31, 1951 |
| 2,806,924 | Olson | Sept. 17, 1957 |